(12) United States Patent
Chopra et al.

(10) Patent No.: US 10,997,036 B1
(45) Date of Patent: May 4, 2021

(54) PREDICTIVE CAPACITY CALCULATION BACKUP MODELING

(71) Applicant: EMC IP Holding Company LLC, Hopkinton, MA (US)

(72) Inventors: Shelesh Chopra, Bangalore (IN); Vladimir Mandic, San Jose, CA (US); Gururaj Kulkarni, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 148 days.

(21) Appl. No.: 15/499,545

(22) Filed: Apr. 27, 2017

(51) Int. Cl.
*G06F 3/06* (2006.01)
*G06F 11/14* (2006.01)

(52) U.S. Cl.
CPC ............ *G06F 11/1458* (2013.01); *G06F 3/06* (2013.01); *G06F 3/065* (2013.01); *G06F 3/0608* (2013.01); *G06F 3/0614* (2013.01); *G06F 3/0652* (2013.01); *G06F 3/0653* (2013.01); *G06F 3/0683* (2013.01)

(58) Field of Classification Search
CPC ............ G06F 17/30138; G06F 3/0608; G06F 3/0652; G06F 3/0653; G06F 3/0683; G06F 3/06; G06F 3/065; G06F 16/1727; G06F 11/1458
See application file for complete search history.

(56) References Cited

U.S. PATENT DOCUMENTS

| | | | | |
|---|---|---|---|---|
| 6,779,003 B1 * | 8/2004 | Midgley | ............. | G06F 11/2071 |
| 8,688,927 B1 * | 4/2014 | Chamness | ............... | G06F 12/02 |
| | | | | 711/154 |
| 8,868,726 B1 * | 10/2014 | Tu | ........................... | H04L 67/32 |
| | | | | 709/223 |
| 2005/0081096 A1 * | 4/2005 | Gold | ................... | G06F 11/1458 |
| | | | | 714/13 |
| 2011/0225017 A1 * | 9/2011 | Radhakrishnan | ............................ | |
| | | | | G06Q 10/06315 |
| | | | | 705/7.25 |
| 2012/0102280 A1 * | 4/2012 | Nasu | ................... | G06F 11/1464 |
| | | | | 711/162 |
| 2016/0306555 A1 * | 10/2016 | Banerjee | ............. | G06F 11/3452 |

OTHER PUBLICATIONS

Stack Exchange, "Why use a database instead of just saving your data to disk?", ARS technica, Jun. 7, 2013, pp. 1-4 http://web.archive.org/web/20130607031213/https://arstechnica.com/information-technology/2013/05/why-use-a-database-instead-of-just-saving-your-data-to-disk/[Sep. 30, 2020 1:48:54 PM] (Year: 2013).*

* cited by examiner

*Primary Examiner* — Reginald G Bragdon
*Assistant Examiner* — Curtis James Kortman
(74) *Attorney, Agent, or Firm* — Workman Nydegger

(57) ABSTRACT

One example method includes surveying a computing environment, creating a profile for a data source discovered during surveying of the computing environment, wherein the profile includes information concerning a particular type of the data source, and creating a map that includes the profile. These processes may be performed by a profiler. The method also includes generating a data storage capacity forecast based in part on information contained in the profile. Generation of the data storage capacity forecast may be performed by a predictive engine.

20 Claims, 6 Drawing Sheets

| Device Name | Source Capacity | Raw data every day | Logical data every day | Current Utilization % | Time to replenish | Device Pool | Timestamp | Alert type |
|---|---|---|---|---|---|---|---|---|
| Device_001 | 1TB | 0.5 TB | 10 GB | 10% | 3 months | Pool1 | xxxxxxx | Info |
| Device_002 | 1TB | 0.5 TB | 200 GB | 70% | 1 week | Pool2 | yyyyyyy | Crit Alert |

*Figure 5*

| Profile | Minimum Size | Maximum Size | Average Size | Average Comp | Average Dedupe |
|---|---|---|---|---|---|
| VM | 40 GB | 100 GB | 50 GB | 35% | 90% |
| Oracle | 100 GB | 500 GB | 200 GB | 10% | 75% |
| Filer-VNX | 1 TB | 1.5 TB | 1 TB | 60% | 95% |
| HDFS-FS | 500 GB | 800 GB | 600 GB | 50% | 99% |

*Figure 6*

| Profile | No of instances | Minimum Size | Maximum Size | Average Size |
|---|---|---|---|---|
| VM | 500 | 40 GB | 100 GB | 50 GB |
| Oracle | 50 | 100 GB | 500 GB | 200 GB |
| Filer-VNX | 5 | 1 TB | 1.5 TB | 1 TB |
| HDFS-FS | 20 | 500 GB | 800 GB | 600 GB |

*Figure 7*

PREDICTIVE CAPACITY CALCULATION BACKUP MODELING

FIELD OF THE INVENTION

Embodiments of the present invention relate to assessment and utilization of data storage capacity. More particularly, at least some embodiments of the invention relate to systems, hardware, computer-readable media, and methods directed to dynamic assessment and utilization of backend storage capacity using techniques such as correlative mapping and/or machine learning.

BACKGROUND

Before backing up important information, a backup administrator must have some assurance that adequate backend capacity exists to support the backup. If adequate backend storage capacity does not exist, the backup may be only partially performed, or may not be performed at all. Although this notion is relatively simple in principle, assessing backend storage capacity is difficult in practice.

For example, changes to the backend storage capacity can affect the performance of a backup, such as when that capacity changes during the course of a backup, or just prior to commencement of a backup. These changes can be disruptive to, and may even prevent, performance of the backup. Thus, the backup administrator may have no assurance that adequate storage capacity will be available for a particular backup.

A related problem is that it may be difficult, or impossible, to predict when changes will occur to the amount of backend storage capacity that is available for a backup process. As a result, it may be difficult for the backup administrator to schedule, and implement, a backup that requires a particular amount of backend storage capacity.

Further, in view of problems such as those noted above, there may be a tendency to purchase relatively more backend storage capacity than will actually be utilized. That is, because the backend storage capacity may be utilized inefficiently, more capacity may be purchased than is actually needed, resulting in unnecessary expenses.

Additionally, or alternatively, in recognition of the lack of assurance that adequate backend storage capacity will be available, fewer backups may be performed so as to increase the likelihood that adequate storage capacity will be available when a backup is ultimately performed. As a result, the backend storage capacity is likely to be underutilized, which is not only inefficient in terms of the number of backups that can be performed within a particular time period, for example, but may also result in increased cost per unit of data stored.

In light of the foregoing, it would be useful to be able to predict how much backend storage capacity is available during a particular timeframe. As well, it would also be useful to be able to dynamically modify the predictions based on changes in conditions.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which:

FIG. 5 discloses aspects of an example target storage device schema;

FIG. 6 discloses aspects of an example dataset schema;

FIG. 7 discloses aspects of an example mapping schema;

DETAILED DESCRIPTION OF SOME EXAMPLE EMBODIMENTS

Figure 1:
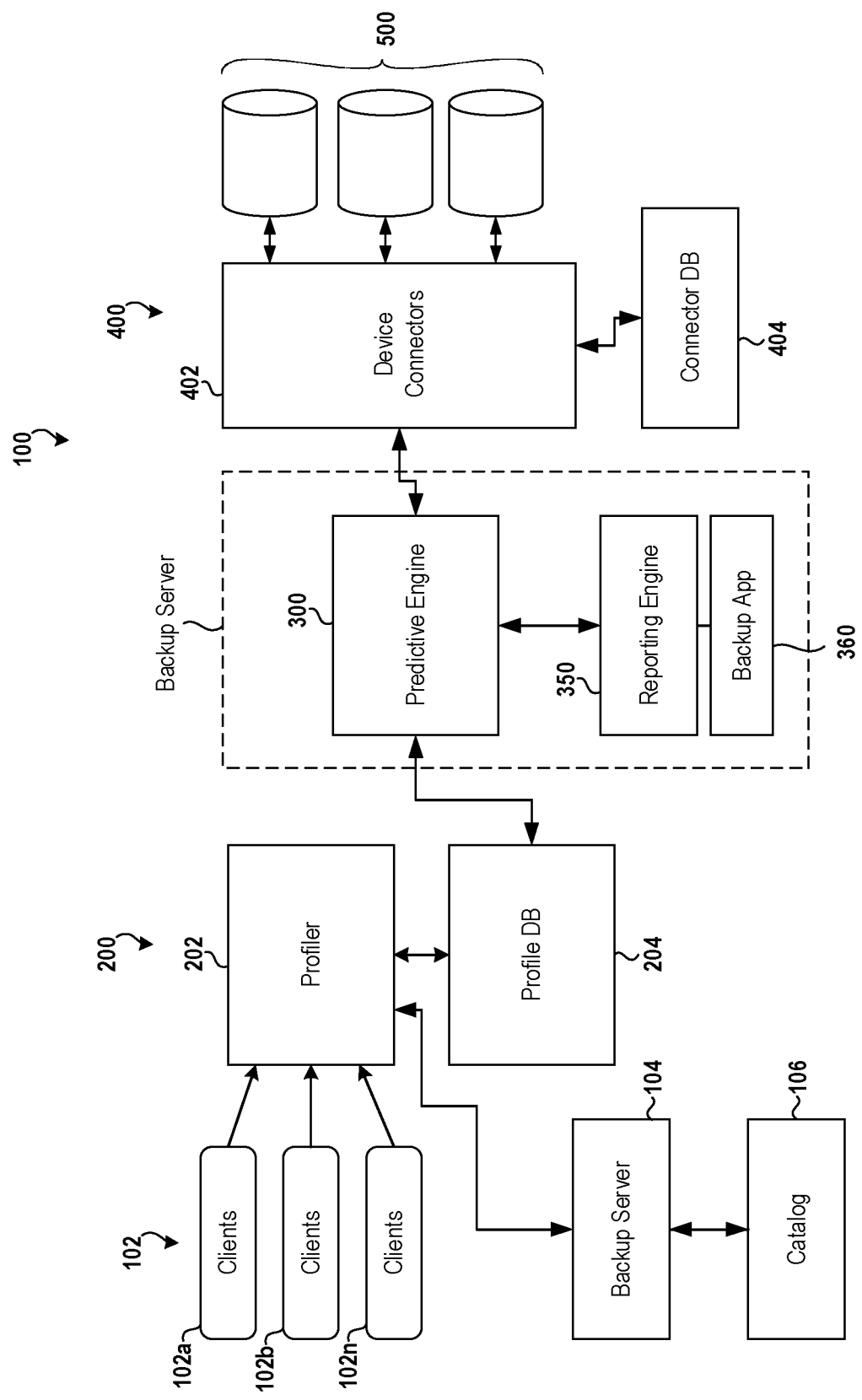
FIG. 1 discloses aspects of an example architecture for at least some embodiments.

Embodiments of the present invention generally concern assessment and utilization of data storage capacity. More particularly, at least some embodiments of the invention relate to systems, hardware, software, computer-readable media, and methods directed to dynamic assessment and utilization of backend storage capacity using techniques such as correlative mapping and/or machine learning.

In one example implementation, an architecture may include a profile engine, predictive algorithm and engine, device connector, and report engine. Any or all of these elements can be implemented as hardware and/or software, and the scope of the invention is not limited to any particular implementation. Backend storage may be referred to herein simply as storage. Following is some basic information regarding each of these components. More detailed information can be found elsewhere herein.

In general, the profile engine connects to the clients/servers in order to obtain the information that is required to understand the nature of the client/server data that is to be backed up. The profile engine can communicate with one or more backup clients and/or backup server/catalogs to get the required information concerning the data, and can store the information in a unique format. Note that while reference is made herein to a backup server, backup application, and backup client, at least some embodiments contemplate the use of a server, application, and client, that perform both backup and restore operations.

The device connectors are interfaces that receive, directly or indirectly, data backups that are targeted for storage in backend storage. The interfaces are connected to target storage devices or other backend storage entities where the backup data from the clients is to be stored. The device connectors can generate, or include, profiles of the target storage devices. The profiles and/or other information can be stored in a device connector database. As well, the device connectors understand the current utilization of backend storage, how data is stored in the backend storage, and what kind of deduplication and/or compression ratio can be achieved when backing up data to the backend storage. Various configurations of the device connectors can be used. In some embodiments, a single device connector can service only a single target storage device, while in other cases, a single device connector may service multiple target storage devices.

The predictive engine, which may comprise or consist of, the predictive algorithm accumulates the data from the connector database and the profile database, and processes that information. Among other things, the predictive engine includes various rules and functionality that will help forecast raw and/or logical storage capacity for some particular point, or timeframe, in the future. For example, the predictive engine may identify one or more correlations between the target storage devices and the source data from the clients, and then provides information on how long the storage capacity of the target storage devices could be expected to last. The forecasted capacity can be based on additional or alternative considerations as well, such as whether or not the source data will be deduplicated before being stored.

As used herein, raw capacity refers to the total amount of stored information that a storage device or medium can hold. Logical capacity is used in connection with data deduplication systems and methods. For such systems and methods that deduplicate data inline as it is stored to disk, the logical disk capacity represents the projected amount of storage that could be available for holding backup data given a usable disk capacity multiplied by the deduplication factor. Usable disk capacity may or may not be the same as raw disk capacity.

Finally, the reporting engine can generate reports that present the data from the predictive engine in various forms, such as a pictorial/trend format for example. Reports relating to any aspect of embodiments of the invention can be generated and disseminated. By way of illustration, reports can be generated that relate to one or more of, backup and restore processes, available storage capacity, and predicted storage capacity.

Operationally, one example embodiment of the invention may involve discovery of the environment, that is, identification of the target storage devices in the backend storage environment and their characteristics, including, for example, the type and amount of data to be backed up. When the various characteristics of interest have been identified, a profile can then be created that captures the characteristics. Profiles can be created on any basis including a per device basis, or an environment-level basis.

Next, the profile can be compared with information obtained in connection with a machine learning process in order to correlate expected data storage needs with predicted data storage capacity. In particular, the machine learning process may, among other things, monitor and process information relating to data storage and restore operations, and can use that information to continually make, and refine, predictions as to the availability of data storage capacity to support backup operations. This comparison process may performed at the profile level.

Finally, a forecast may be made as to the expected capacity requirement needed to support a particular backup. The backup can then be scheduled and run. A post-processing analysis can also be performed to evaluate the strength of the correlation between the predicted capacity and the actual capacity consumed during the backup process. The output of this post-processing analysis may comprise an input to further refinement of the capacity prediction process.

A. Aspects of Example System Architectures

The following is a discussion of aspects of system architectures according to some example embodiments of the invention. This discussion is not intended to limit the scope of the invention, or the applicability of the embodiments, in any way.

In general, embodiments of the invention may include and/or be implemented in a data protection system operating environment that includes one or more storage systems or storage environments, various client systems and devices that generate data and perform, and/or request performance of, operations with respect to backed up data, such as search, read, and write operations. Such operations can be performed in connection with one or more data backup and/or data restore processes. Thus, processes such as are disclosed herein may be performed by a backup and/or restore application, which can be hosted on a server, that communicates directly or indirectly with one or more clients that generate and transmit read and write requests, although other applications could alternatively be employed. The backup and/or restore application may also communicate, directly or indirectly, with storage and/or storage servers in order to service client read and write requests directed to the storage and/or storage servers.

Example storage environments with which embodiments of the invention may be employed, may take the form of a cloud storage environment, an on-premises storage environment, and hybrid storage environments that include public and private elements, although the scope of the invention extends to any other type of storage environment as well. More generally, embodiments of the invention can be implemented in any suitable environment and the scope of the invention is not limited to the example environments disclosed herein.

Any of the devices, including the clients, in the operating environment can take the form of software, physical machines or virtual machines (VM), though no particular client implementation is required for any embodiment. Similarly, data protection system components such as databases, storage servers, backup servers, restore servers, backup clients, and restore clients, for example, can likewise take the form of software, physical machines or virtual machines (VM), though no particular component implementation is required for any embodiment.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, and any group of one or more of the foregoing.

Some example embodiments of the invention will be described with reference to a data storage system in the form of a storage system configured to store files, but it should be understood that the principles of the disclosure are not limited to this configuration. Rather, they are applicable to any system capable of storing and handling various types of objects, in analog, digital, or other form. Although terms such as document, file, or object may be used by way of example, the principles of the disclosure are not limited to any particular form of representing and storing data or other information. Rather, such principles are equally applicable to any object capable of representing information.

With particular reference now to FIG. 1, an example architecture 100 may include a plurality of clients 102, such as clients 102*a*, 102*b*, and 102*n* for example. In general, the clients 102 may include and/or access various applications, of any kind, that generate data that is desired to be backed up in storage and, if or when the need arises, later restored to the clients 102. The data that is desired to be protected may be referred to herein as target data, and the backend storage element(s) where the target data is to be stored may be referred to as target storage devices. Entities, such as the clients 102 for example, that generate data that is desired to be protected may be referred to herein as data sources.

One, some, or all, of the clients 102 may communicate with a profile system 200 that includes a profiler 202 and profile database 204. In general, the profile system can obtain information concerning, for example, the configuration of the clients 102, and the type and amount of client 102 data that is targeted for backup. This information is used by the profiler 202 to generate client-specific profiles for each client 102. This information, and the profiles generated based on the information, can be stored in the profile database 204. In some embodiments, the profile system 200 can be included as an element of a backup and/or restore server, while in other embodiments, the profile system 200 may be implemented as a stand-alone system. No particular configuration or arrangement of the profile system 200 is required however.

The profiler 202 can be implemented as a profile engine which connects to the clients 102 and to obtain the information that is required to understand the nature of the data that is to be backed up. Where the profile system 200 is implemented in a stand-alone configuration, the profiler 202 can communicate not only with the clients 102 but also with one or more backup servers 104 and/or associated catalogs 106 to obtain information concerning the target data, and the profiler 202 can store that information, such as in the profile database 204, in a unique format.

Figure 2:
FIG. 2 discloses aspects of an example schema that may be generated by a profile engine.

With continued reference to FIG. 1, and directing attention now to FIG. 2 as well, an example schema 206 is shown that illustrates various types of information that can be collected from the clients 102 by the profiler 202 and used by the profiler 202 to create one or more client profiles. As indicated, the example schema 206 includes information for each of a plurality of clients, including the identity of the target dataset for that client, the type of data included in the target dataset, the raw source capacity of the backend data storage, the extent, if any, to which the target data has been deduplicated or can be deduplicated, the extent, if any, to which the target data has been compressed or can be compressed, and the identity of the pool to which the client in question belongs. The schema 206 is provided only by way of example, and other schemas could include additional and/or alternative data fields such as, for example, the relative priority of the target data for backup, and a preferred time or date to run the backup of the target data. Thus, the scope of the invention is not limited to the example illustrated schema.

Returning to FIG. 1, the example architecture 100 may additionally include a predictive engine 300 that communicates with the profile database 204 and a reporting engine 350. In general, and as noted earlier, the predictive engine 300 includes various rules and functionality that will help forecast raw and/or logical storage capacity for some particular point, or timeframe, in the future. This capacity information can be used to inform the scheduling and execution of backups of target data. Further details concerning some specific example embodiments of a predictive engine are disclosed elsewhere herein. As further indicated in FIG. 1, the predictive engine 300 and reporting engine 350 can be elements of a backup server which may also include a backup application 360 that can cooperate with a backup and/or restore client (not shown) on each of a plurality of the clients 102 to back up source data, that is, client 102 data.

The example architecture 100 further includes a connector system 400 that comprises one or more device connectors 402 that are each connected to a connector database 404. The connector system 400 may, in some embodiments, reside in a storage environment together with the storage 500. Examples of such storage environments are disclosed herein and include, but are not limited to, cloud storage environments.

The device connectors 402 are interfaces that connect, either directly or indirectly through one or more intervening entities, data backups from clients 102 and/or servers for example, with one or more target storage devices of storage 500, where the backup data is to be stored. The device connectors 402 can generate, obtain, and/or include, profiles of one, some, or all, of the target storage devices. The profiles and/or other information can be stored in the device connector database 404.

As well, the device connectors 402 understand the current utilization of backend storage 500, how data is stored in the backend storage 500, and what kind of deduplication and/or compression ratio can be achieved when backing up target data to the backend storage 500. Such information can be obtained from a schema, such as the schema 206 for example as shown in FIG. 2. Moreover, various configurations and arrangements of the device connectors 402 can be used. In some embodiments, a single device connector 402 may service only a single target storage device, while in other cases, a single device connector 402 may service multiple target storage devices.

Figure 3:
FIG. 3 discloses aspects of an example schema for a group of device connectors.

In the example schema 450 of FIG. 3, information is provided for each of a plurality of device connectors, and each device connector can be associated with a specific target storage device. Various information for each device connector can be stored in the connector database 404. Examples of such information are shown in the schema 450 and include, but are not limited to, the name of the target storage device, device category, whether or not data deduplication and data compression are enabled for the target storage device, the raw source capacity of the target storage device, the extent to which the capacity is currently utilized, and the name of the device pool to which the target storage device belongs. Various additional and/or alternative information can be included in the schema 450, and the scope of the invention is not limited to the disclosed examples.

B. Example Host Configuration

Figure 4:
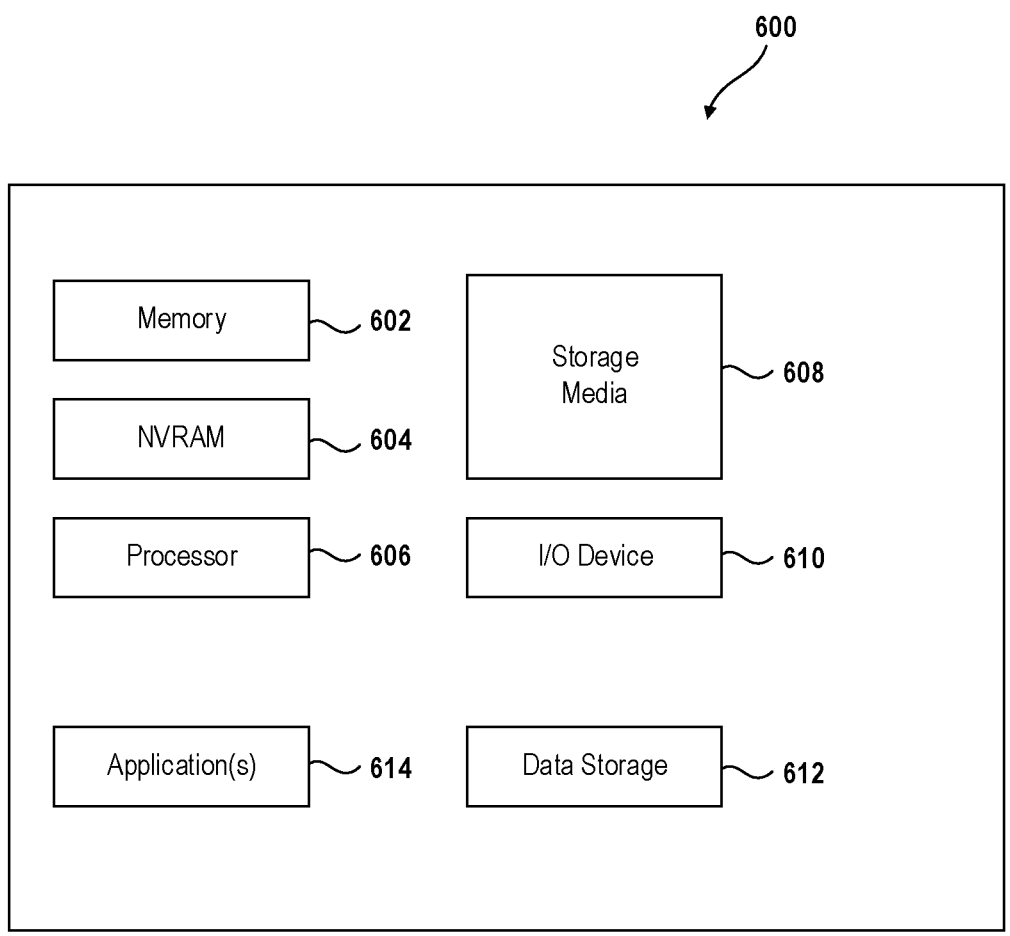
FIG. 4 discloses aspects of an example host configuration.

With reference briefly to FIG. 4, one or more of the clients 102, profiler 202, profile database 204, predictive engine 300, reporting engine 350, device connectors 402, connector database 404, and storage 500 can take the form of a physical computing device, one example of which is denoted at 600. In the example of FIG. 4, the physical computing device 600 includes a memory 602 which can include one, some, or all, of random access memory (RAM), non-volatile random access memory (NVRAM) 604, read-only memory (ROM), and persistent memory, one or more hardware processors 606, non-transitory storage media 608, I/O device 610, and data storage 612. One or more of the memory components of the physical computing device can take the form of solid state device (SSD) storage. As well, one or more applications 614 are provided that comprise executable instructions. Such executable instructions can take various forms including, for example, a profiler 202, predictive engine 300, reporting engine 350, or device connector 402.

B. Aspects of Example Engines and Associated Processes

As noted earlier, at least some embodiments of the invention include a predictive engine and reporting engine, examples of which are disclosed in FIG. 1. With continued attention to FIG. 1, and directing attention now to FIGS. 5, 6 and 7 as well, further details are provided concerning some example embodiments of a predictive engine and reporting engine. In general, at least some example embodiments within the scope of the invention involve the use of the processes of correlative mapping, and machine learning. These techniques and/or other disclosed herein may be employed in the specific fields of data storage capacity forecasting and analysis. In at least some embodiments, a predictive engine may comprise, or consist of, a machine learning algorithm, examples of which are disclosed herein.

More particularly, embodiments of the invention are directed to improvements in computer-related technology at least insofar as those embodiments enable predictions to be made concerning available storage capacity for a backup process and/or other processes. For example, embodiments of the invention may involve the transformation of data concerning the historical use of storage into a form suitable for another use. One example of such a form is a storage capacity forecast and/or into a backup schedule. As well, embodiments of the invention may involve changes in the way that an entity, such as client, backup server, data storage platform, and/or other entities, operates.

Among other things then, at least some embodiments of the invention may at least partly resolve a variety of problems, one example of which is the need for more accurate and timely forecasts of data storage capacity. Another problem that may be resolved by at least some embodiments is the relatively inefficient use of data storage capacity. Embodiments of the invention may at least partly resolve other problems as well. Details concerning various particular solutions to such problems are disclosed herein.

Directing particular attention now to the aforementioned Figures, a predictive engine, one example of which is the predictive engine 300, generally accumulates the data from a connector database and a profile database, and processes that information. In general, the predictive engine comprises, or consists of, one or more rules that can be used to help forecast the expected available storage capacity such as backend storage capacity for example, and correspondingly, the amount of backend storage capacity that has been consumed.

In more detail, the predictive engine can perform a process that identifies and/or creates a correlation between the target storage devices and the source data and then provides the information on how long the available storage capacity of the target storage devices could be expected to last if the source data were to be stored at the target storage devices. In general, the correlation can be performed at any level, examples of which include a storage device level, or a storage device pool level.

Thus, correlative algorithms according to the invention can employ an combination of parameters or information to correlate one or more target storage devices with source data and, as such, the correlative algorithm can be relatively simple, or relatively complex. For example, some embodiments of the correlative algorithm may only employ two storage device related parameters in generating a data storage capacity forecast. More generally however, the correlative algorithm enables a user to consider and define, using information such as is disclosed in the schema 700 for example, any of a wide variety of different perspectives of the storage devices, and then use those perspectives to generate storage capacity forecasts.

More particularly, and with reference to the example target storage device schema 700 disclosed in FIG. 5, the predictive engine can obtain information such as the target storage device name, the nominal storage capacity of the storage device, the daily amounts of raw and logical data, respectively, stored in the storage device, the level of utilization of the storage capacity of the storage device (expressed as a percentage of nominal storage capacity, for example), time to replenish (for example, time until storage capacity is fully utilized—this time can be modified by a loading factor), the identity of a device pool that the storage device belongs to, a timestamp associated with the storage device, and whether the storage device type is enabled for specific behaviors like deduplication and compression. Using this and/or other information, the predictive engine can then apply various rules to project the raw capacity as well as logical capacity of the target storage device(s).

As further indicated in the example device schema 700, various alerts, warnings, and other notifications, can be employed in connection with one or more embodiments of the invention. Thus, for example, the predictive engine can obtain information on various alerts, such 'Information' or 'Critical' that have been activated for a particular storage device. Information may indicate, for example, that 50% of storage capacity has been utilized, while a Critical alert may indicate, for example, that 90% of storage capacity has been utilized. Thus, in some embodiments at least, the alerts can be based on utilization information and/or information concerning the rate at which the storage capacity is being consumed. In at least some embodiments, a rule engine, which can be a stand-alone entity, or an element of the predictive engine, enables a user to define various alert types, such as the aforementioned examples, based on one or more triggers that can be set by the user. Following is a discussion of one example of a rule that can be generated and run according to some embodiments of the invention.

The following rule assumes that a particular target storage device, or pool of target storage devices, as the case may be, has data deduplication enabled, such that source data is deduplicated prior to being backed up at the target storage device.

Rule_0001
Forecasted capacity:
amount of data the storage device can store (raw)/amount of data to be handled daily [deduplicated/unique data]: 100 GB (raw storage capacity)/1 GB (daily storage load)=100 days (of storage capacity)
current utilization: 50% (50 GB of the raw storage capacity)
Time to replenish:
capacity left for number of days*loading factor: 50*0.8=40 days The loading factor, 0.8 in this example, serves as a buffer to help cover the risk that storage capacity may run out sooner than expected. That is, it may be better to not wait to replenish storage capacity until existing storage capacity has been fully utilized. Rather, the storage capacity can be replenished, in this example, when 80 percent of the storage capacity has been consumed.

As the foregoing example illustrates, various considerations can be used to generate rules used to create a data storage capacity forecast. In this illustrative example, these considerations include deduplication, raw data storage capacity, amount of data handled daily, and a loading factor.

These and/or other considerations can be employed in any combination to define still other rules that can be used to create a data storage capacity forecast.

With reference now to FIGS. 6 and 7, which disclose some example schemas 725 and 750, respectively, details are provided concerning some example embodiments of a machine learning algorithm and associated functionality that can be used in connection with the data storage capacity forecast rules. Among other things, the machine learning algorithm can continuously refine backup processes based on ongoing inputs to the algorithm. Because an enterprise may be assumed to scale up/scale down their infrastructure based on their needs, the functionality provided by the machine learning algorithm may enable the enterprise to more precisely determine how much backend storage capacity is actually needed. In particular, as more and more datasets having similar, or identical, logical blocks are captured, the machine learning algorithm can readjust the parameter values and the prediction as to required data storage capacity. In this way, the enterprise may have increased assurance that it is only scaling its storage infrastructure to the extent necessary, and is not scaling up or down excessively. Among other things, this may result in lower per bit storage costs, as well as reducing or eliminating the purchase of storage capacity before it is actually needed.

In more detail, as one or more backup servers continue to cooperate with various backup clients to back up data in a backend storage system, the backup servers create a map of each dataset that is backed up by the particular backup server. As shown in the schema 725 for example, maps can be created for datasets of various types such as, for example, a virtual machine (VM), a SAP-Oracle dataset, a Filer-VNX dataset, and a Hadoop Distributed File System (HDFS). These are provided solely by way of example and, more generally, embodiments of the invention can be employed in connection with any type, number, size, and combination of datasets. As used herein, Filer is a type of fileserver which is being protected via Network Data Management Protocol (NDMP), an open standard protocol for enterprise-wide backups of heterogeneous network-attached storage.

The example maps can include any parameters of interest that are desired to be used in the machine learning algorithm. As shown in the schema 725, such parameters, which may be specified by a user, may include, but are not limited to, minimum dataset size, maximum dataset size, average dataset size, average compression rate, and average deduplication. Additional and/or alternative parameters can also be used in other embodiments.

Given example data such as what is shown in the example schema 725, if more dataset instances are added and/or dataset instances are changed, the predictive engine can recalculate one, some, or all, of the parameters, and then use the recalculated values to update a storage capacity forecast. For example, the predictive engine can recalculate and provide real-time data based on the type of dataset instance that is added and the average/min/max size values of the new dataset instance that was added, with inbuilt standard variances. The forecast can be produced at any level. For example, it is possible to forecast the data storage capacity at the logical group level based on respective quotas for Oracle backups, and VM backups, if separate quotas have been defined for each of the protection profiles. The quota for each logical group level, or any other level, can be defined based on any considerations, and the foregoing are presented only by way of example. Moreover, the use of quotas is not required and as such, quotas are not employed in every embodiment.

The recalculation and forecast updating processes can occur in real time, or nearly so, as dataset instances are added, removed, and/or changed. In this way, the predictive algorithm may be constantly, and automatically, updated to reflect changing conditions in the storage environment. These changes or refinements, in turn, provide relatively more accurate storage capacity forecasts as the dataset that serves as the basis for the storage capacity forecasts increases in size. Moreover, because the recalculation and forecast updating processes can occur in real time, the reliability of the storage capacity forecast may be relatively high.

To briefly illustrate with an example, if the VM instances listed in the schema 725 are newly added, size information such as minimum size, maximum size, and/or average size of the VM instances can form a basis for adjustment of estimates for the parameters shown in the schema 700, such as adjustment to the expected values of 'raw data every day,' and 'logical data every day.' In particular, the logical data stored every day in Device_001 may increase as a result of the addition of the VM instances and, as such, the 'logical data every' day value prediction may correspondingly be adjusted upward. This adjustment to the 'logical data every' day value prediction may, in turn, may serve as a basis for updating a current utilization rate and time to replenish, as illustrated by the example Rule disclosed above in connection with the discussion of FIG. 5. As illustrated by the foregoing example, changes to the instances associated with a storage device can be used as a basis to refine and adjust predictions as to the expected storage capacity of that device, and the time to replenish.

With reference now to FIG. 7, details are provided concerning some further example processes that can be performed by various embodiments of the invention. For example, such processes, which can be performed independently and/or as part of a single continuous process, can include discovering and scanning a data zone or infrastructure, identifying any unprotected environments, mapping a profile of an unprotected environment, and operating the machine learning algorithm to determine how much storage capacity would be required. As used here, an unprotected environment refers to an environment in which source data is generated but the source data has not been targeted for backup. The following example is illustrative of the aforementioned processes.

Initially, the discovering and scanning processes may reveal an unprotected environment that includes various types of devices, filesystems, and other data that is desired to be backed up. These may include VMs, Oracle databases, Filer-VNX instances, and HDFS-FS instances, for example. The unprotected environment can then be mapped, as shown in the schema 750 of FIG. 7. Such mapping can include, for example, identifying the number of instances of a particular type of dataset, and identifying the average/minimum/maximum sizes for the instances of the dataset. With this information, storage capacity forecasts can be made at various levels of granularity. In some instances, the storage capacity forecasts can also be based on any of the information that was previously stored by the predictive engine concerning, for example, the devices of the schema 700 and/or the profiles of the schema 725.

To illustrate the generation of storage capacity forecasts at different levels of granularity, particular reference is now made to the schema 750 of FIG. 7. As shown, the following storage forecasts may be generated:

- to protect the unprotected environment for VMs only, 50 TB of protection storage would have to be added (500×100 max size);
- to protect the unprotected environment for Oracle only, 25 TB of protection storage would have to be added (50×500 max size);
- to protect the unprotected environment for Filers-VNX only, 7.5 TB of protection storage would have to be added (5×1.5 max size);
- to protect the unprotected environment for HDFS-FS only, 16 TB of protection storage would have to be added (20×800 max size); and
- to protect all of the unprotected environment, 98.5 TB of protection storage would have to be added (sum of all added protection storage).

C. Aspects of Some Example Methods

Figure 8:
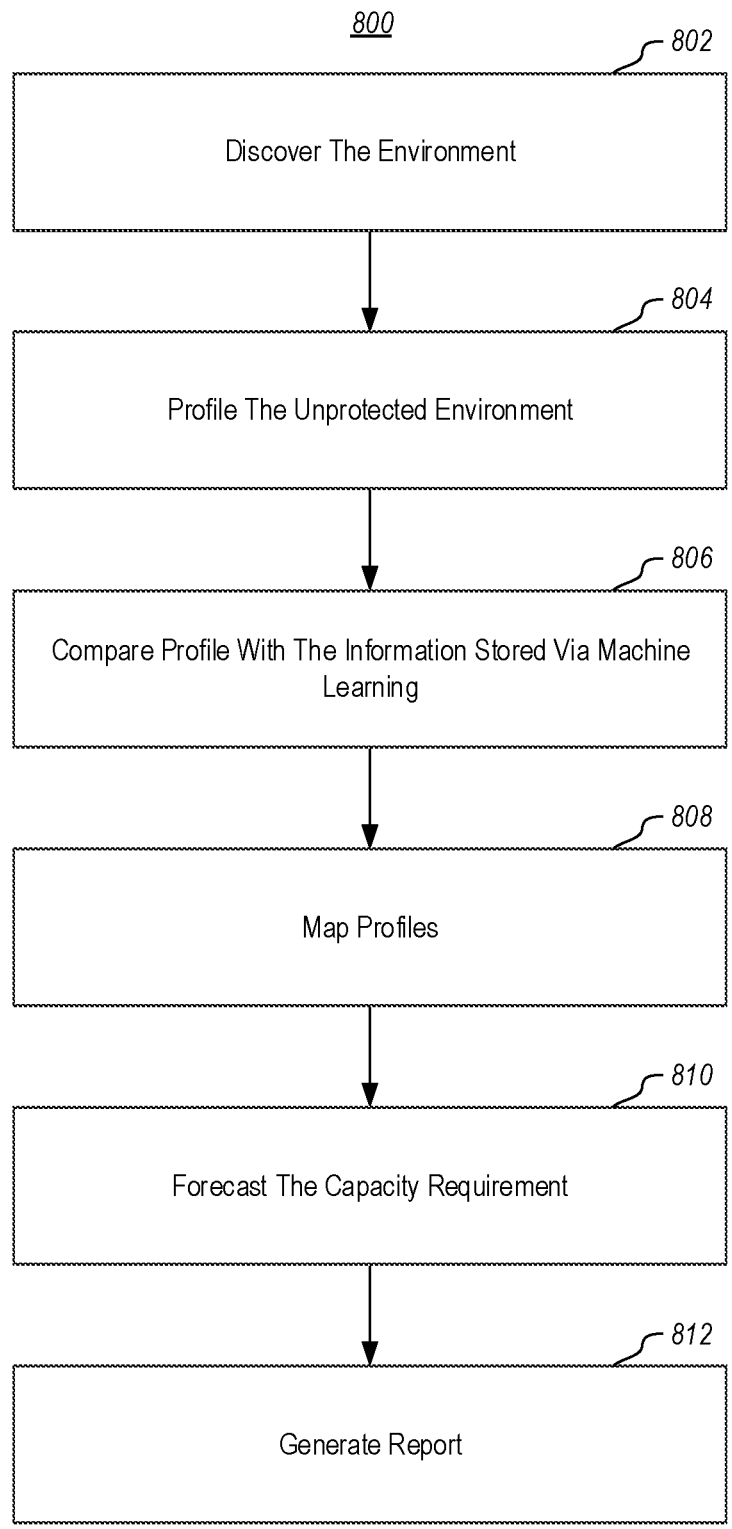
FIG. 8 is a flow diagram that discloses aspects of an example method according to one or more embodiments of the invention.

With attention now to FIG. 8, and continued reference to the example of FIG. 7, details are provided concerning aspects of methods according to some embodiments of the invention, where one example of such a method is denoted generally at 800. Part, or all, of the method 800 can be performed by and/or at the direction of a profiler and predictive engine, examples of which are disclosed herein.

The method 800 can begin when an environment discovery process is performed 802, such as by a profiler for example. This process may involve querying a particular computing environment to identify information such as, for example, the type, location, and volume of source data that has not been backed up or targeted for backup. As well, the discovery process can identify new data sources such as clients, databases, and filesystems for example, that were not present or identified during a prior discovery process.

When the discovery process 802 has been completed, a profile is then created 804 that captures the characteristics identified during discovery. The profile may be created 804 by the profiler, and may be created on any basis, including a per device basis, or an environment-level basis. The profile, or profiles, created can include any of the information, or any combinations of information, disclosed in the examples of FIGS. 6 and 7, although additional or alternative information can also be included in the profile(s).

Next, the profile can be compared 806, such as by a predictive engine for example, with information obtained in connection with a machine learning process in order to correlate expected data storage needs with predicted data storage capacity. The comparison process 806 may performed at the profile level, and/or any other level. In more detail, the machine learning process may, among other things, monitor and process information relating to data storage and restore operations, and can use that information to continually make, and refine, predictions as to the availability of data storage capacity to support backup operations. If the environment has not previously been surveyed, the comparison process 806 may be omitted in at least some embodiments.

After the comparison process 806 has been performed, the various profiles can be mapped 808 to generate a schema, or map, one example of which is disclosed in FIG. 7, as discussed above. The map, which reflects part, or all, of the environment that was discovered 807, can include multiple profiles, each of which may correspond, for example, to a particular type of data source in the discovered environment.

When the map has been generated 808, a data storage forecast can be generated 810 that takes into account the results of the discovery and mapping processes, such as the discovery of new data sources for example, and a report generated 812 concerning any aspect(s) of the process 800, including the data storage forecast. Generation of the data storage forecast 810 can include updating of an existing data storage forecast and/or creating of a new data storage forecast created.

While not specifically indicated in FIG. 8, one or more backups can be scheduled and performed that relate to a profile, or profiles, such as are included in the map. In some embodiments, the backups are not performed until after the processes 802 through 810 have been performed. In connection with the backup(s), a post-processing analysis can also be performed to evaluate the strength of the correlation between the predicted capacity and the actual capacity consumed during the backup process. The output of this post-processing analysis may comprise an input to further refinement of the capacity prediction process.

Figure 9:
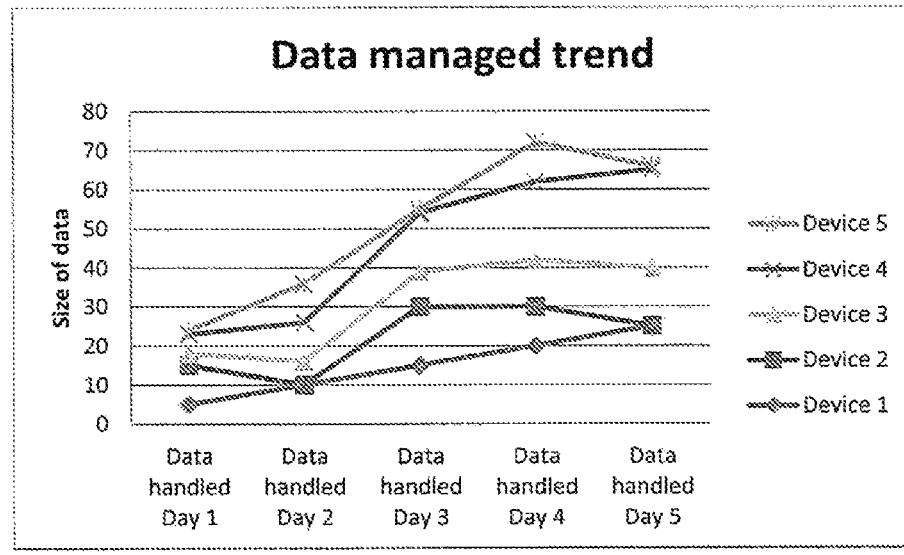
FIG. 9 is a chart that shows trend line information for managed data.
Figure 10:
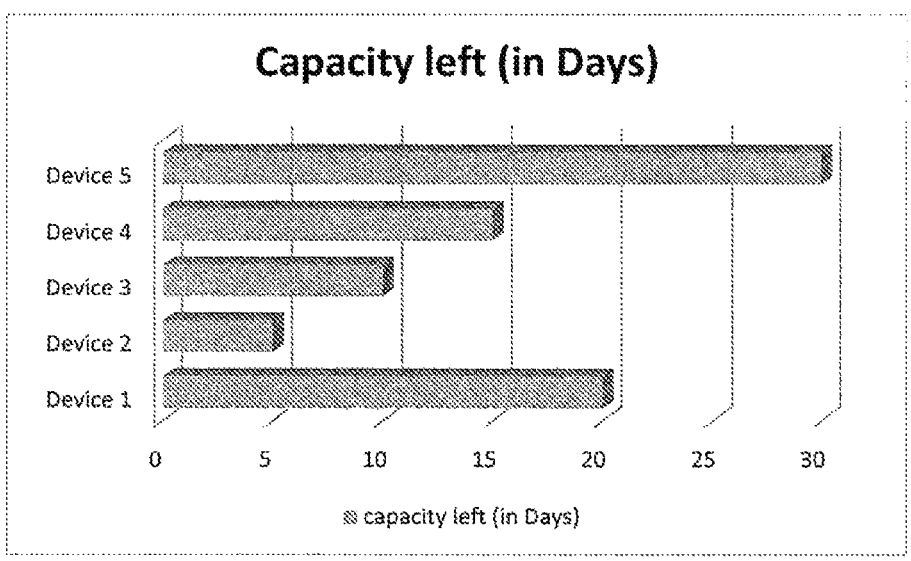
FIG. 10 is an example of a report.

With reference now to FIG. 9, and continued reference to FIG. 8, it was noted that part of the process 800 may include generation of reports 812. Thus, FIG. 9 discloses an example of a report generated, by a reporting engine for example, that shows the data generated by the predictive engine in a pictorial trend-line manner. Reports can be generated concerning any aspect of the method 800, including, for example, any of the information shown in schemas 700, 725, and 750. Another example of a report, shown in FIG. 10, that can be generated is a 'Time to Replenish' report including indicators that show the number of days.

D. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   surveying a computing environment, wherein surveying the computing environment comprises:
     identifying a client in the computing environment;
     identifying a configuration of the client; and
     identifying, for the client, an amount of client data targeted for backup;
   generating, by a profiler based on the surveying, a client-specific profile for the client, wherein the client-specific profile includes characteristics of the client;
   for a target storage device that is operable to receive, from a backup server that includes a backup application, a backup dataset that includes some of the client data targeted for backup and is operable to store the received client data, generating a target storage device profile that includes one or more characteristics of the target storage device, wherein the target storage device profile is generated by a device connector associated with the target storage device, wherein the device connector serves to connect the target storage device with the backup server that includes the backup application such that a backup generated by the backup application can be transmitted by the backup server to the target storage device by way of the device connector;
   with a predictive engine that obtains data from a profile database that stores the target device storage profile generated by the device connector and that obtains data from a connector database that stores information about the device connector, correlating the target storage device with the client data targeted for backup, and the correlating is based on the data obtained by the predictive engine from the profile database and from the connector database;
   generating, by the predictive engine using a machine learning process, a data storage capacity forecast based in part on the correlating, wherein the data storage capacity forecast relates to an amount of data storage space projected to be consumed by a backup of the client data targeted for backup; and
   running, by the backup server, a backup process that backs up the client data targeted for backup at the target storage device, and the backup process is performed when the data storage capacity forecast indicates that adequate data storage space is and/or will be available to support the backup process.

2. The method as recited in claim 1, wherein the client-specific profile comprises any one or more of: a raw source capacity of the client; an extent to which the client data targeted for backup has been, or can be, deduplicated; and, an extent to which the client data targeted for backup has been, or can be, compressed.

3. The method as recited in claim 1, wherein generating a data storage capacity forecast using the machine learning process implemented by the predictive engine comprises one of: updating, in real time, an existing data storage capacity forecast based upon information included in the client-specific profile and/or the target storage device profile; or, generating, in real time, a new data storage capacity forecast based upon information included in the client-specific profile and/or the target storage device profile.

4. The method as recited in claim 1, wherein the target storage device profile comprises any one or more of: information concerning whether or not data deduplication is enabled for the target device; whether or not data compression is enabled for the target device; a raw capacity of the target device; and, a current utilization of a storage capacity of the target device.

5. The method as recited in claim 1, wherein the data storage capacity forecast is generated for the target storage device based at least in part upon an amount of data that can be stored by the target storage device, an amount of data to be handled by the target storage device on a particular time basis, a current utilization of the target storage device, and a loading factor for the target storage device.

6. The method as recited in claim 1, wherein the data storage capacity forecast is expressed in terms of a time to replenish storage capacity.

7. The method as recited in claim 1, wherein the data storage capacity forecast is expressed in terms of a time to replenish storage capacity, and the time to replenish storage capacity is expressed as: current utilization x loading factor.

8. The method as recited in claim 1, further comprising gathering information concerning usage of the target storage device, wherein the information comprises a basis for generation of the data storage capacity forecast.

9. The method as recited in claim 1, further comprising creating a map of the client data that is backed up by the backup process.

10. A non-transitory storage medium having stored therein instructions which are executable by one or more hardware processors to perform operations comprising:
surveying a computing environment, wherein surveying the computing environment comprises:
identifying a client in the computing environment;
identifying a configuration of the client; and
identifying, for the client, an amount of client data targeted for backup;
generating, by a profiler based on the surveying, a client-specific profile for the client, wherein the client-specific profile includes characteristics of the client;
for a target storage device that is operable to receive, from a backup server that includes a backup application, a backup dataset that includes some of the client data targeted for backup and is operable to store the received client data, generating a target storage device profile that includes one or more characteristics of the target storage device, wherein the target storage device profile is generated by a device connector associated with the target storage device, wherein the device connector serves to connect the target storage device with the backup server that includes the backup application such that a backup generated by the backup application can be transmitted by the backup server to the target storage device by way of the device connector;
with a predictive engine that obtains data from a profile database that stores the target device storage profile generated by the device connector and that obtains data from a connector database that stores information about the device connector, correlating the target storage device with the client data targeted for backup, and the correlating is based on the data obtained by the predictive engine from the profile database and from the connector database;
generating, by the predictive engine using a machine learning process, a data storage capacity forecast based in part on the correlating, wherein the data storage capacity forecast relates to an amount of data storage space projected to be consumed by a backup of the client data targeted for backup; and
running, by the backup server, a backup process that backs up the client data targeted for backup at the target storage device, and the backup process is performed when the data storage capacity forecast indicates that adequate data storage space is and/or will be available to support the backup process.

11. The non-transitory storage medium as recited in claim 10, wherein the client-specific profile comprises any one or more of: a raw source capacity of the client; an extent to which the client data targeted for backup has been, or can be, deduplicated; and, an extent to which the client data targeted for backup has been, or can be, compressed.

12. The non-transitory storage medium as recited in claim 10, wherein generating a data storage capacity forecast using the machine learning process implemented by the predictive engine comprises one of: updating, in real time, an existing data storage capacity forecast based upon information included in the client-specific profile and/or one of the target storage device profile; or, generating, in real time, a new data storage capacity forecast based upon information included in the client-specific profile and/or one of the target storage device profile.

13. The non-transitory storage medium as recited in claim 10, wherein the target storage device profile comprises any one or more of: information concerning whether or not data deduplication is enabled for the target device; whether or not data compression is enabled for the target device; a raw capacity of the target device; and, a current utilization of a storage capacity of the target device.

14. The non-transitory storage medium as recited in claim 10, wherein the data storage capacity forecast is generated for the target storage device based at least in part upon an amount of data that can be stored by the target storage device, an amount of data to be handled by the target storage device on a particular time basis, a current utilization of the target storage device, and a loading factor for the target storage device.

15. The non-transitory storage medium as recited in claim 10, wherein the data storage capacity forecast is expressed in terms of a time to replenish storage capacity.

16. The non-transitory storage medium as recited in claim 10, wherein the data storage capacity forecast is expressed in terms of a time to replenish storage capacity, and the time to replenish storage capacity is expressed as: current utilization x loading factor.

17. The non-transitory storage medium as recited in claim 10, wherein the operations further comprise gathering information concerning usage of the target storage device, wherein the information comprises a basis for generation of the data storage capacity forecast.

18. The non-transitory storage medium as recited in claim 10, wherein the operations further creating a map of the client data that is backed up by the backup process.

19. A system, comprising:
one or more hardware processors; and
a non-transitory storage medium having stored therein instructions which are executable by the one or more hardware processors to perform operations comprising:
surveying a computing environment, wherein surveying the computing environment comprises:
identifying a client in the computing environment;
identifying a configuration of the client; and
identifying, for the client, an amount of client data targeted for backup;
generating, by a profiler based on the surveying, a client-specific profile for the client, wherein the client-specific profile includes characteristics of the client;
for a target storage device that is operable to receive, from a backup server that includes a backup application, a backup dataset that includes some of the client data targeted for backup and is operable to store the received client data, generating a target storage device profile that includes one or more characteristics of the target storage device, wherein the target storage device profile is generated by a device connector associated with the target storage device, wherein the device connector serves to connect the target storage device with the backup server that includes the backup application such that a backup generated by the backup application can be transmitted by the backup server to the target storage device by way of the device connector;
with a predictive engine that obtains data from a profile database that stores the target device storage profile generated by the device connector and that obtains data from a connector database that stores information about the device connector, correlating the target storage device with the client data targeted for backup, and the correlating is based on the respective data obtained by the predictive engine from the profile database and from the connector database;

generating, by the predictive engine using a machine learning process, a data storage capacity forecast based in part on the correlating, wherein the data storage capacity forecast relates to an amount of data storage space projected to be consumed by a backup of the client data targeted for backup; and running, by the backup server, a backup process that backs up the client data targeted for backup at the target storage device, and the backup process is performed when the data storage capacity forecast indicates that adequate data storage space is and/or will be available to support the backup process.

20. The system as recited in claim 19, wherein generating a data storage capacity forecast using the machine learning process implemented by the predictive engine comprises one of: updating, in real time, an existing data storage capacity forecast based upon information included in the client-specific profile and/or the target storage device profile; or, generating, in real time, a new data storage capacity forecast based upon information included in the client-specific profile and/or the target storage device profile.

* * * * *